United States Patent [19]

Brown

[11] Patent Number: 5,074,273
[45] Date of Patent: Dec. 24, 1991

[54] CARBURETOR AND FUEL PRECONDITIONER

[76] Inventor: Paul M. Brown, P.O. Box 44203, Boise, Id. 83711

[21] Appl. No.: 708,305

[22] Filed: May 31, 1991

[51] Int. Cl.$^5$ .............................................. F02M 17/26
[52] U.S. Cl. .................................. 123/538; 123/522; 123/537; 261/DIG. 83
[58] Field of Search .............. 123/538, 537, 522, 536, 123/3, 1 A, 316, 252, 523; 261/DIG. 83; 48/144, 219, 180.1

[56] References Cited

U.S. PATENT DOCUMENTS

| | | | |
|---|---|---|---|
| 1,938,497 | 12/1933 | Pogue | 261/DIG. 83 |
| 2,122,683 | 7/1938 | Faverty | 48/144 |
| 3,635,200 | 1/1972 | Rundell et al. | 123/538 |
| 3,918,412 | 11/1975 | Lindstrom | 123/3 |
| 3,989,477 | 11/1976 | Wilson et al. | 48/219 |
| 4,076,002 | 2/1978 | Mellqvist | 123/25 L |
| 4,122,802 | 10/1978 | Noguchi et al. | 123/1 A |
| 4,223,645 | 9/1980 | Nohira et al. | 123/316 |
| 4,267,976 | 5/1981 | Chatwin | 123/538 |
| 4,426,984 | 1/1984 | Gilbert | 123/522 |
| 4,858,582 | 8/1989 | Brown | 123/1 A |

Primary Examiner—Andrew M. Dolinar
Assistant Examiner—M. Macy
Attorney, Agent, or Firm—Paul F. Horton

[57] ABSTRACT

An improved carburetor and fuel preconditioner for internal combustion engines comprising a first air conduit; a bubble chamber receiving air from said conduit and for bubbling the air through a fuel; a vapor chamber for receiving the air-fuel mixture; catalytic beads held within said bubble chamber for contacting and cracking fuel coming into contact therewith; a second air conduit for receiving an independent source of atmospheric air; and one or more pill cans located between the vapor chamber and the second air conduit for controlling the richness of the air-fuel mixture which is fed from the second air conduit into the intake manifold of an internal combustion engine for superior efficiency. Another pill can may be located between the vapor chamber and the intake manifold for controlling and feeding the highly volatile mixture from the vapor chamber directly to the intake manifold.

7 Claims, 1 Drawing Sheet

CARBURETOR AND FUEL PRECONDITIONER

BACKGROUND OF THE INVENTION

1. Field of the Invention

This invention relates to catalytic cracking of fuel immediately prior to entry into an internal combustion engine, and, more particularly, relates to carburetors provided with catalytic beads for accomplishing the same.

2. Description of the Prior Art

It is well known in the art that to maximize efficiency, fuel should be catalyzed to the shortest molecular chains possible. Cracking of fuel is, of course, used in the production of gasoline. Excessive cracking at the source of production produces fuel having superior combustion, but causes insurmountable storage and transportation problems. It is, therefore, most desirable that cracking be accomplished at a point nearest the point of combustion as possible.

Many devices have been created to obtain catalytic cracking at nor near the engine. U.S. Patents to Noguchi et al, U.S. Pat. No. 4,122,802 and Nohira et al, U.S. Pat. No. 4,223,645 are representative of devices having reactors separate from the carburetors. The only known carburetion systems for the cracking of fuels are those of B. J. Robinson, U.S. Pat. No. 4,295,816, which utilizes a soluble catalyst and is therefore very expensive, and U.S. Pat. No. 4,858,582, issued to the present inventor. The Brown device has mixing valves which mixes only the air pulled through the bubble chamber and has been found to have problems as to controlling the richness and therefore the operating and efficiency of the engine.

SUMMARY OF THE INVENTION

The present invention of Paul M. Brown overcomes these problems and provides greater fuel efficiency with less noxious fume emissions by providing a carburetor-fuel preconditioner which has a first conduit providing atmospheric air into a catalytic loaded bubble chamber and a second, separate, source of atmospheric air for independent fuel-air mixing. Pill cans, located between the vapor chamber of the bubble chamber and the second air conduit, control the amount of air-fuel mixture reaching the second conduit. Optionally, another pill can be located between the vapor chamber and the intake manifold to provide air-fuel mixture directly to and as close to the piston-cylinder units as deemed possible for carburetor type fuel preconditioners.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
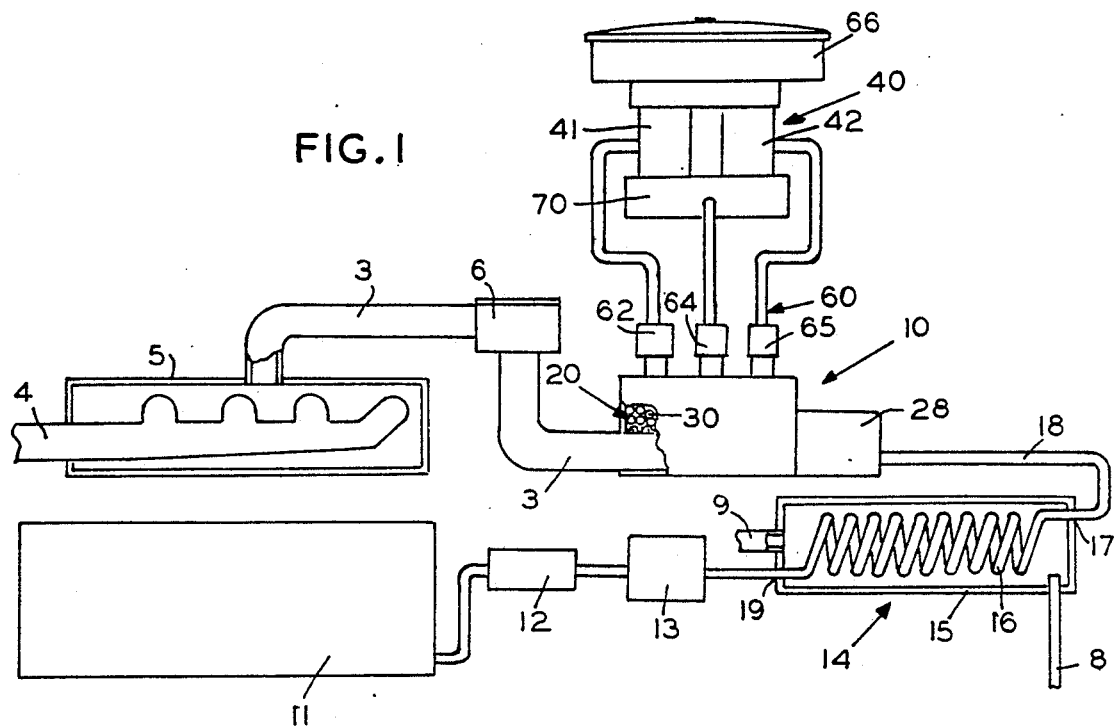
FIG. 1 shows a schematic representation of the fuel system of the present invention.

Referring first to FIG. 1, a schematic showing an improved carburetor-fuel preconditioner device 10 in a fuel system for an internal combustion engine is shown. Fuel, coming from fuel tank 11 is pumped through a filter 12 by fuel pump 13 into a liquid fuel preheater assembly 14 before entering fuel bowl 28 through conduit 18. Preheater 14 includes a copper cylinder 15 with spiral tubing 16 as conduit for the fuel which enters through fuel inlet 19 and exits through fuel exit 17. Hot engine coolant enters the cylinder 15 at inlet 8; passes through the cylinder in heat exchange relation with tubing 16, exiting through outlet 9. Air entering bubble chamber 20 of device 10 is first pulled through a cylinder 5 where the air is heated by being in heat exchange relation with an exhaust manifold 4; is then pulled through first conduit 3 and through air filter 6. Atmospheric air for controlled mixing is pulled through an air filter 66; through second air intake conduit 40, preferably provided with venturis 41 and 42, where the air is mixed with the air-fuel mixture being pulled through control means 60 from the bubble chamber; and thence to the intake manifold 70 and on into cylinders, not shown, of the engine.

Figure 2:
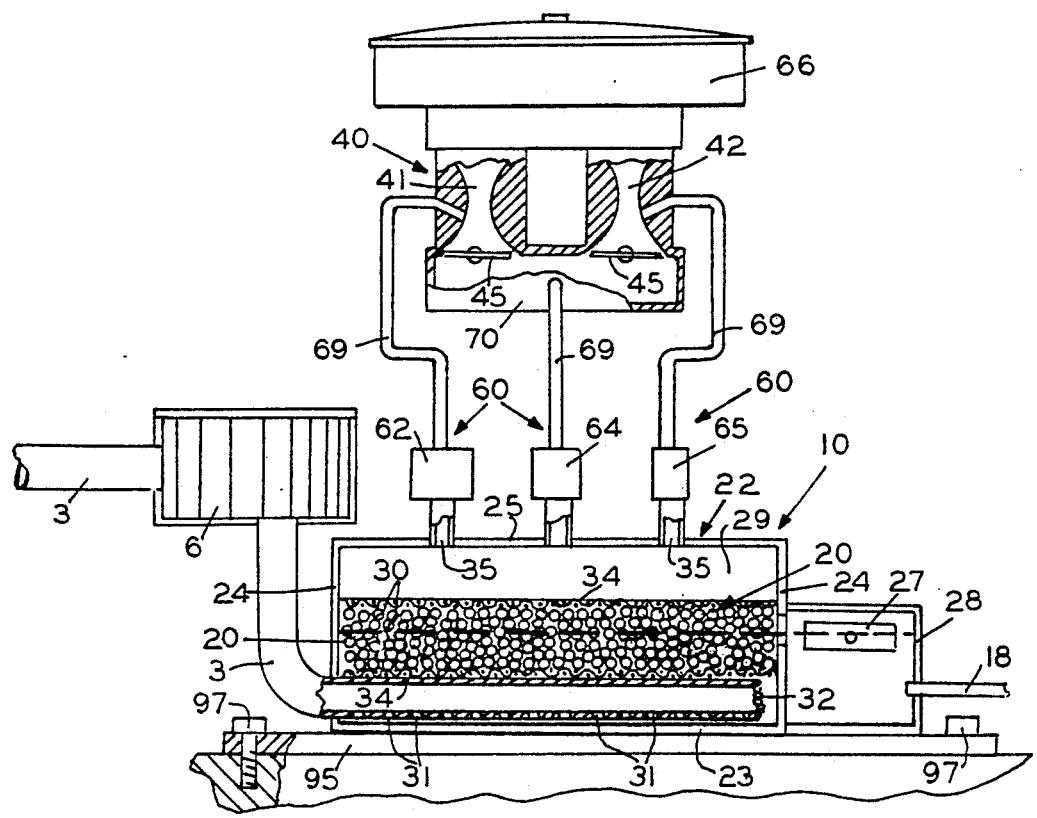
FIG. 2 is a view, in partial section, of the improved carburetor-fuel preconditioner of the present invention.

Referring now to FIG. 2, an embodiment to be preferred of improved carburetor-fuel preconditioner device 10, made according to the present invention is disclosed. Device 10 includes, generally, a first atmospheric intake conduit 3; a bubble chamber 20; a multiplicity of catalytic beads 30, contained within the bubble chamber; a second atmospheric intake conduit, designated generally by the numeral 40; and control means, designated by the numeral 60 for controlling catalyzed fuel-air mixture flowing from the bubble chamber to the second conduit and to intake manifold 70.

Bubble chamber 20 includes an air tight housing 22 attachable to an engine block by means of a base plate 95, held in place by retention bolts 97. Housing 22 includes a bottom wall 23, side walls 24 and a top wall 25. Leading into chamber 20 is first air conduit 3 through sidewall 24, with which it is sealed. Within chamber 20, conduit 3 is provided with a plurality of openings 31, preferably one-eight inch in diameter and spaced along the conduit every one-half inch. Conduit 3 terminates with a coarse screen covering 32 within and at the bottom of the bubble chamber. Surrounding conduit 3 and resting upon each other and the interior floor of the bottom wall 23 of the bubble chamber are a multiplicity of catalytic beads 30, preferably consisting of platinum. A screen 34 connected to opposing side walls of the bubble chamber holds the beads in place to minimize sloshing of the fuel and to effectively separate the chamber into a lower chamber holding fuel and beads and an upper, air-fuel vapor chamber 29. To hold the fuel, here gasoline, at a proper level within the bubble chamber, the level shown by dotted lines, a conventional float 27 contained in float bowl 28, is used.

Fuel-air vapor, rich in short chain molecules, flows from vapor chamber 29 through outlet ports 35; through control means 60; and through conduits 69 into second air conduit 40 and, optionally, into intake manifold 70 of an internal combustion engine, not shown. Second air conduit 40 is preferably provided with a primary venturi 41 and a secondary venturi 42, each opening by means of butterfly valves 45 into intake manifold 70. While second air conduit 40 is shown provided with its own air filter 66, shown in FIG. 1, it is obvious that a common air filter may be provided for both first conduit 3 and second conduit 40.

Control means 60 preferably consists of a series of pill cans, conventional in the art. A large pill can 65 leads to the secondary venturi; a medium pill can 62 to the primary venturi; and a small pill can 64 directly to the intake manifold. In this manner, a desired fuel-air ratio may be obtained in second air conduit 40, and, more particularly, in injection venturies 41 and 42.

In operation, and assuming a vacuum within intake manifold 70, air is pulled from the atmosphere into cylinder 5 where it is preheated; into first air conduit 3; through air filter 6, through openings 31 and screen 32 and into gasoline or other liquid fuel located within the bubble chamber. The air then bubbles up through the gasoline and catalytic beads; the beads serving as a center of adsorption for both the heated fuel and air to provide a vaporous mixture. Long chain fuel molecules contacting the beads are cracked into shorter chains. The super rich air-fuel vapor is then pulled through pill cans 62, 64, and 65 into the venturies and directly into the intake manifold 70, and thence into piston-cylinder units of the engine, not shown.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. An improved carburetor and fuel preconditioner device for internal combustion engines, comprising:
    a first atmospheric air intake conduit;
    a bubble chamber operable to hold liquid fuel at a selected level therein, said bubble chamber provided with one or more air ports located below said fuel level for receiving atmospheric air from said first air intake conduit for bubbling air through the fuel and said bubble chamber defining an air-fuel vapor chamber above said fuel level;
    a multiplicity of catalytic beads located within said bubble chamber in contact with the fuel and with air drawn through said ports;
    a second atmospheric air intake conduit for receiving an air supply separate from said first conduit, said second conduit in fluid communication with said vapor chamber of said bubble chamber for receiving a fuel-air vapor mixture therefrom and for mixing and conducting the same to an intake manifold of the internal combustion engine; and
    control means located between said vapor chamber of said bubble chamber and said second conduit for controlling the amount of fuel-air mixture entering said second conduit.

2. The device as described in claim 1 further comprising second control means located between said vapor chamber of said bubble chamber and the intake manifold for controlling the amount of fuel-air mixture fed directly into the intake manifold.

3. The device as described in claim 1 wherein said second air conduit is provided with at least one venturi; wherein said venturi is in fluid communication with the vapor chamber of said bubble chamber; and wherein said control means is located between said vapor chamber and said venturi.

4. The device as described in claim 3 wherein said control means consists of at least one pill can.

5. An improved carburetor and fuel preconditioner device for internal combustion engines, comprising:
    a first atmospheric air intake conduit;
    a bubble chamber operable to hold liquid fuel at a selected level therein, said bubble chamber provided with one or more air ports located below said fuel level for receiving atmospheric air from said first air intake conduit for bubbling air through the fuel and said bubble chamber defining an air-fuel vapor chamber above said fuel level;
    a multiplicity of catalytic beads located within said bubble chamber in contact with the fuel and with air drawn through said ports;
    a second atmospheric air intake conduit for receiving an air supply separate from said first conduit, said second conduit provided with at least one venturi, said venturi in fluid communication with said vapor chamber of said bubble chamber for receiving a fuel-air vapor mixture therefrom and for mixing and conducting the same to an intake manifold of the internal combustion engine; and
    control means consisting of at least one pill can, located between said vapor chamber of said bubble chamber and said second conduit for controlling the amount of fuel-air mixture entering said second conduit.

6. The device as described in claim 5 further comprising second control means located between said vapor chamber of said bubble chamber and the intake manifold for controlling the amount of fuel-air mixture fed directly into the intake manifold.

7. The device as described in claim 6 wherein said second control means comprises a pill can.

* * * * *